United States Patent
Scott et al.

(10) Patent No.: US 11,003,188 B2
(45) Date of Patent: May 11, 2021

(54) METHOD, SYSTEM AND APPARATUS FOR OBSTACLE HANDLING IN NAVIGATIONAL PATH GENERATION

(71) Applicant: Zebra Technologies Corporation, Lincolnshire, IL (US)

(72) Inventors: Bradley M. Scott, Mississauga (CA); Peter Arandorenko, Mississauga (CA); Harsoveet Singh, Mississauga (CA); Sadegh Tajeddin, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 157 days.

(21) Appl. No.: 16/189,593

(22) Filed: Nov. 13, 2018

(65) Prior Publication Data

US 2020/0150666 A1    May 14, 2020

(51) Int. Cl.
  *G05D 1/02*    (2020.01)
  *G05D 1/00*    (2006.01)
  (Continued)

(52) U.S. Cl.
  CPC ......... *G05D 1/0214* (2013.01); *G05D 1/0088* (2013.01); *G05D 1/0238* (2013.01);
  (Continued)

(58) Field of Classification Search
  CPC .. G05D 1/0214; G05D 1/0088; G05D 1/0238; G05D 1/0274; G05D 2201/0216;
  (Continued)

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

Lu, David; Hershberger, Dave; and Smart, William, Layered Costmaps for Context-Sensitive Navigation, 2014, IEEE/RSJ, p. 710, 713-714 (Year: 2014).*

(Continued)

*Primary Examiner* — Aniss Chad
*Assistant Examiner* — Chase L Cooley

(57) ABSTRACT

A method of navigational path planning for a mobile automation apparatus includes: obtaining an apparatus localization in a common frame of reference and a localization confidence level; detecting an obstacle boundary by one or more apparatus sensors; obtaining an obstacle map indicating the obstacle boundary in the frame of reference; generating a dynamic perimeter region of the obstacle boundary defining obstruction probabilities for respective distances from the obstacle boundary according to the localization confidence level; obtaining an environmental map indicating a predefined obstacle boundary; generating, for the predefined obstacle boundary, a static perimeter region defining obstructed space; identifying an obstructed portion of the dynamic perimeter region based on the obstruction probabilities and the apparatus localization; generating a navigational path traversing unobstructed space, that excludes the obstructed portion of the dynamic perimeter region, and the static perimeter region; and controlling the apparatus to traverse the generated navigational path.

18 Claims, 10 Drawing Sheets

(51) Int. Cl.
*G06K 9/00* (2006.01)
*G06T 7/62* (2017.01)
*G06T 7/70* (2017.01)

(52) U.S. Cl.
CPC ....... *G05D 1/0274* (2013.01); *G06K 9/00805* (2013.01); *G06T 7/62* (2017.01); *G06T 7/70* (2017.01); *G05D 2201/0216* (2013.01); *G06T 2207/30261* (2013.01)

(58) Field of Classification Search
CPC ......... G06K 9/00805; G06T 7/62; G06T 7/70; G06T 2207/30261
See application file for complete search history.

(56) References Cited

U.S. PATENT DOCUMENTS

| | | |
|---|---|---|
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |

(56) References Cited

U.S. PATENT DOCUMENTS

| | | |
|---|---|---|
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1* | 9/2010 | Yamamoto ............ G05D 1/024 701/26 |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1* | 5/2014 | Schnittman .......... G05D 1/0227 700/253 |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |

(56) References Cited

U.S. PATENT DOCUMENTS

| | | |
|---|---|---|
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyayskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Heist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0094876 A1* | 3/2019 | Moore .................. G05D 1/024 |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |

(56) References Cited

FOREIGN PATENT DOCUMENTS

| WO | WO 2018204342 | 11/2018 |
|---|---|---|
| WO | WO 2019023249 | 1/2019 |

OTHER PUBLICATIONS

Fernandes, Miguel; Alexandre, Luis, Dynamic Recognition of Obstacles for Optimal Robot Navigation, 2016, Universidade de Beira Interior, p. 1-2 (Year: 2016).*
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n. 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
"Fair Billing with Automatic Dimensioning", pp. 1-4, undated, Copyritght Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Facade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced Pca-based localization using depth maps with missing data," IEEE, pp. 1-8, Apr. 24, 2013.

(56) References Cited

OTHER PUBLICATIONS

Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France.
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient Ransac for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publishillinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.

* cited by examiner

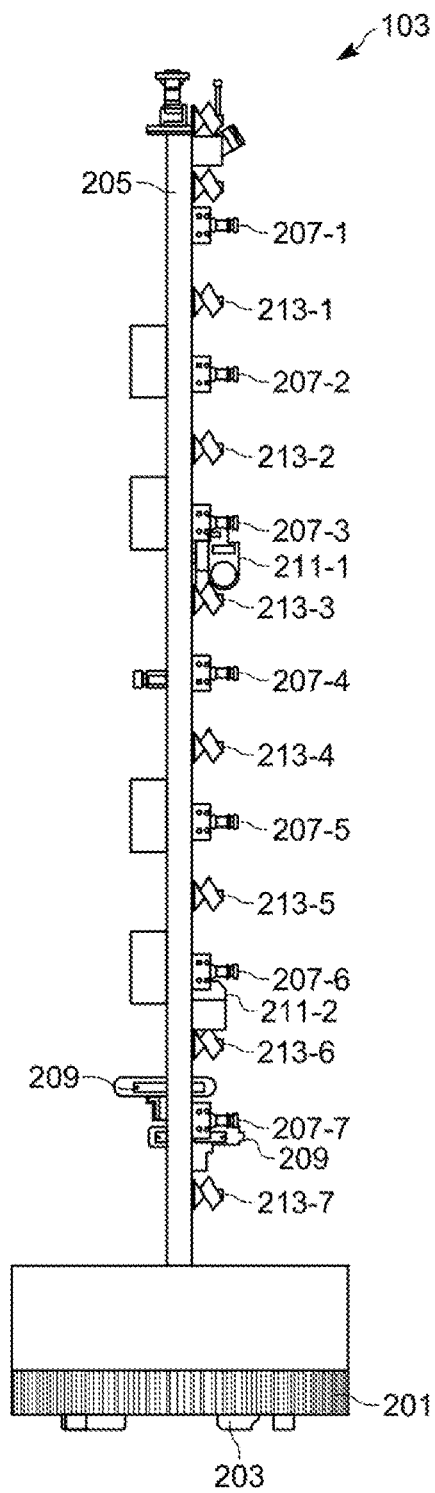
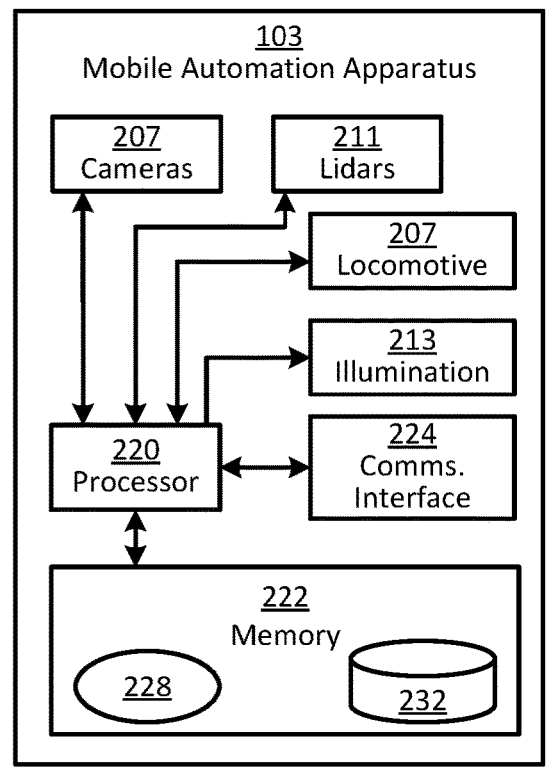
FIG. 2B
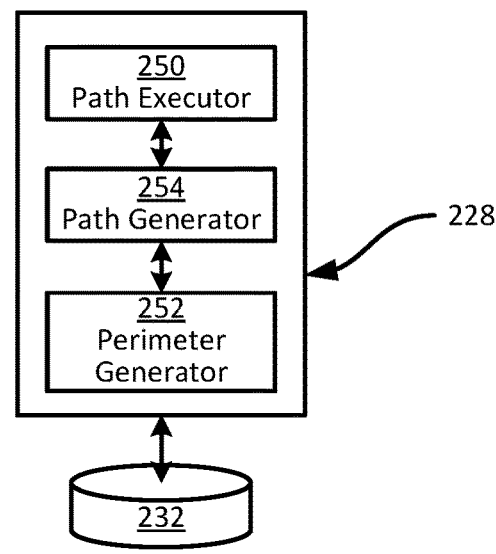
FIG. 2A
FIG. 2C

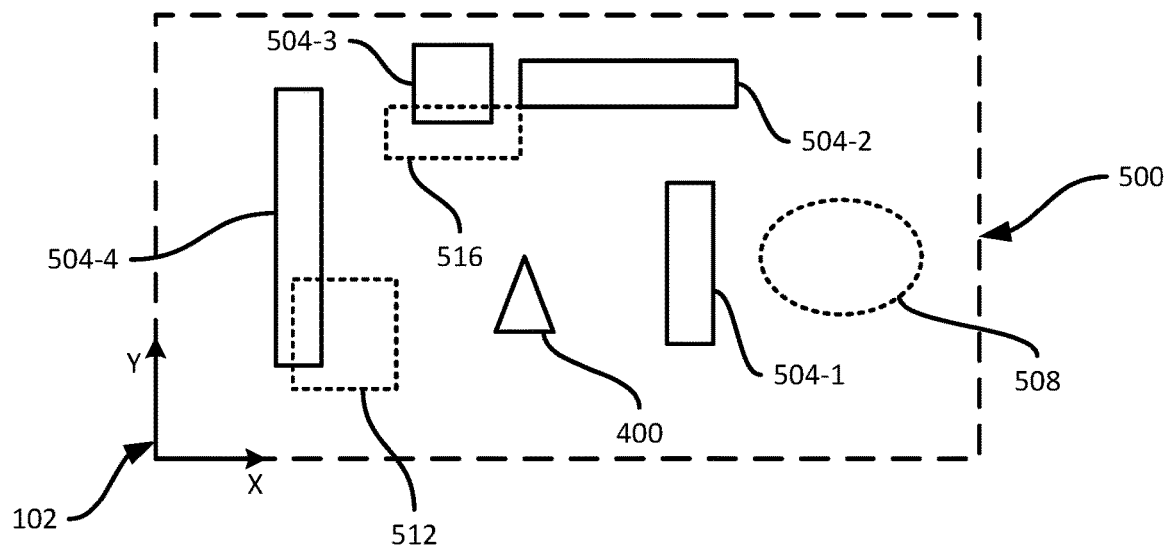
FIG. 5A
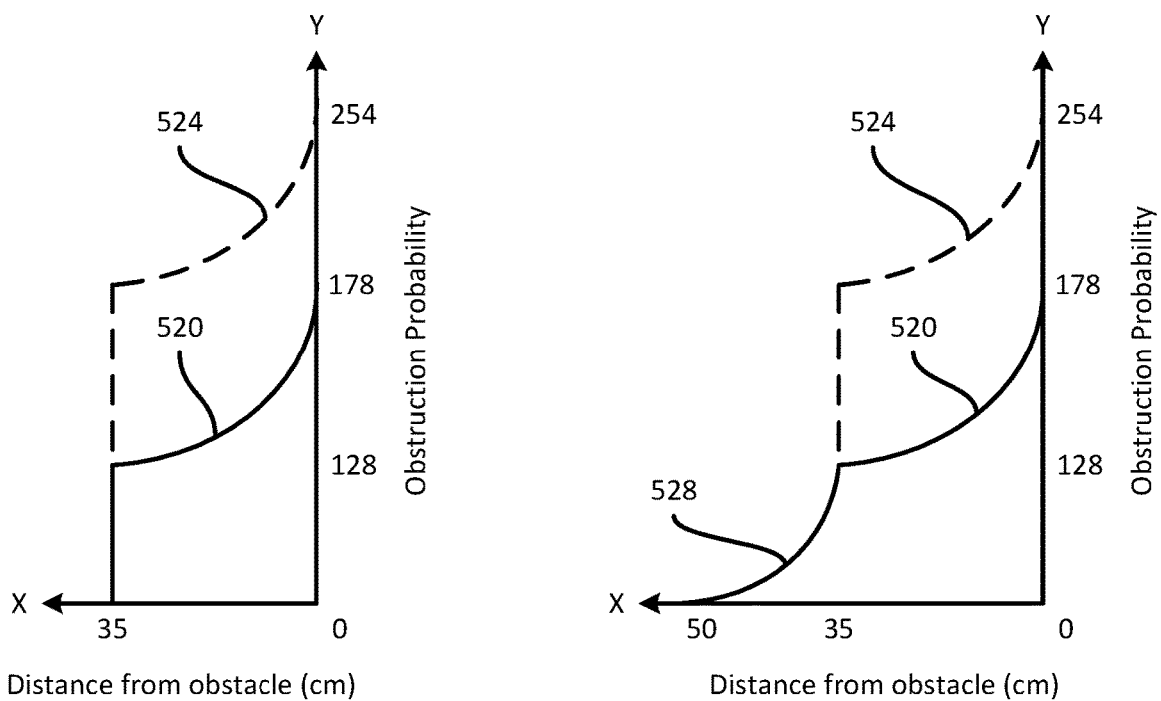
FIG. 5B
FIG. 5C

METHOD, SYSTEM AND APPARATUS FOR OBSTACLE HANDLING IN NAVIGATIONAL PATH GENERATION

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile automation apparatus may be employed to perform tasks within the environment, such as capturing data for use in identifying products that are out of stock, incorrectly located, and the like. To travel within the environment, a path is generated. Errors in localization of the mobile automation apparatus in the environment impose an increased computational load and reduce system efficiency

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2A depicts a mobile automation apparatus in the system of FIG. 1.

FIG. 2B is a block diagram of certain internal hardware components of the mobile automation apparatus in the system of FIG. 1.

FIG. 2C is a block diagram of certain internal components of the apparatus of FIG. 1.

FIG. 5A is a diagram illustrating an obstacle map generated during the performance of the method of FIG. 3.

FIGS. 5B and 5C are diagrams illustrating example obstruction probability functions applied to the obstacle map during the performance of the method of FIG. 3.

Figure 1:
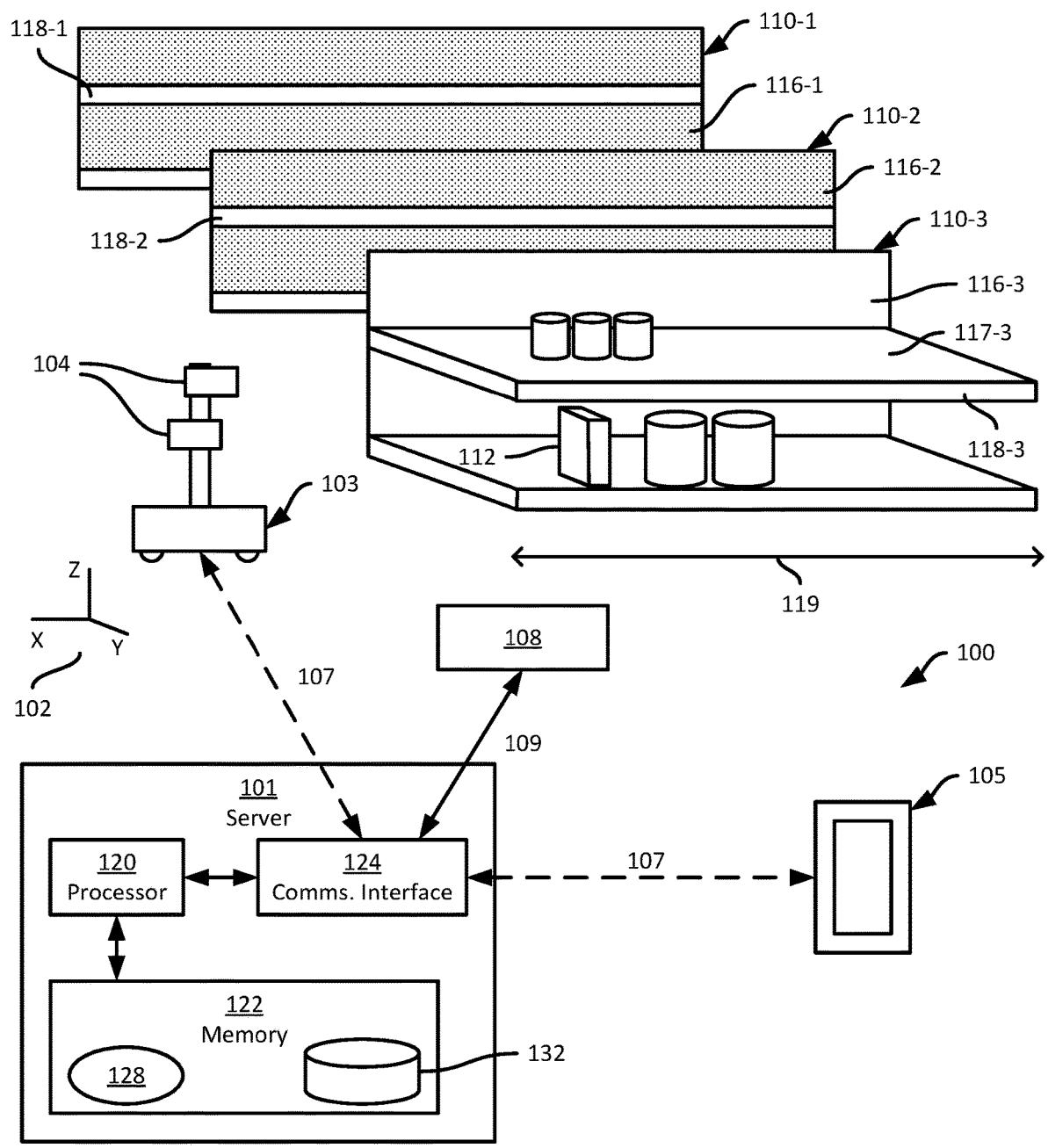
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of navigational path planning for a mobile automation apparatus, the method comprising: obtaining (i) a localization of the mobile automation apparatus in a common frame of reference and (ii) a localization confidence level of the mobile automation apparatus; detecting an obstacle boundary by one or more sensors disposed on the mobile automation apparatus; obtaining an obstacle map indicating the detected obstacle boundary in the common frame of reference; generating a dynamic perimeter region of the detected obstacle boundary, the dynamic perimeter region defining, for a set of distances from the detected obstacle boundary, respective obstruction probabilities according to the localization confidence level; obtaining a predefined environmental map indicating, in the common frame of reference, a predefined obstacle boundary; generating, for the predefined obstacle boundary, a static perimeter region defining obstructed space; identifying an obstructed portion of the dynamic perimeter region based on the obstruction probabilities and the localization of the mobile automation apparatus; generating a navigational path traversing unobstructed space within the common frame of reference, the unobstructed space excluding (i) the obstructed portion of the dynamic perimeter region, and (ii) the static perimeter region; and controlling the mobile automation apparatus to traverse the generated navigational path.

Additional examples disclosed herein are directed to a mobile automation apparatus for navigational path planning, comprising: one or more navigational sensors disposed on the mobile automation apparatus; a memory storing a predefined environmental map indicating, in a common frame of reference, a predefined obstacle boundary; a navigational controller connected to the memory, the navigational controller including: a path executor configured to: obtain, via the one or more navigational sensors, (i) a localization of a mobile automation apparatus in a common frame of reference and (ii) a localization confidence level; obtain, via the one or more navigational sensors, an obstacle map indicating, in the common frame of reference, an obstacle boundary detected via mobile automation apparatus sensor data; a perimeter generator configured to generate a dynamic perimeter region of the obstacle boundary, the dynamic perimeter region defining, for a set of distances from the obstacle boundary, respective obstruction probabilities according to the localization confidence level; a path generator configured to retrieve the predefined environmental map; the perimeter generator further configured to generate, for the predefined obstacle boundary, a static perimeter region defining obstructed space; the path generator further configured to: identify an obstructed portion of the dynamic perimeter region based on the obstruction probabilities and the localization of the mobile automation apparatus; and generate a navigational path traversing unobstructed space within the common frame of reference, the unobstructed space excluding (i) the obstructed portion of the dynamic perimeter region, and (ii) the static perimeter region; the path executor further configured to control a locomotive mechanism of the mobile automation apparatus to traverse the generated navigational path.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. As will be described in greater detail below, the apparatus 103 is configured to navigate among the shelves 110 and/or other obstacles in the environment via the generation of one or more navigational paths. As will be discussed in greater detail below, the navigational paths can include global paths, consisting of sequences of poses (i.e. positions and orientations within the frame of reference 102). A global path typically extends from a starting location (e.g. the current location of the apparatus 103) to a goal location. The navigational paths also include local paths, including sets of locomotive commands for execution by the apparatus 103 to follow the guiding poses set by the global path. The generation of both global and local paths includes the identification of unobstructed space within the environment (i.e. space that does not contain an obstacle), as will be discussed below in greater detail.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, such as target locations at which to capture shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to controlling the apparatus 103 to navigate among the shelves 110 and capture data. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the common frame of reference 102 previously established in the retail facility, permitting data captured by the mobile automation apparatus 103 to be registered to the common frame of reference. The above-mentioned location of the apparatus 103 within the frame of reference 102, also referred to as localization, is employed in the generation of paths for execution by the apparatus 103.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, one or more maps of the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

In the present example, the apparatus 103 is configured (via the execution of the application 228 by the processor 220) to generate navigational paths to travel through the environment, for example to reach goal locations provided by the server 101. The apparatus 103 is also configured to control the locomotive mechanism 203 to travel along the above-mentioned paths. To that end, the apparatus 103 is configured, as will be discussed below in greater detail, to detect obstacles in the surroundings of the apparatus 103 and to identify unobstructed space within the frame of reference 102 based on obstacle detections and the above-mentioned maps, to enable the generation of paths through the unobstructed space.

As will be apparent in the discussion below, other examples, some or all of the processing performed by the server 101 may be performed by the apparatus 103, and some or all of the processing performed by the apparatus 103 may be performed by the server 101. That is, although in the illustrated example the application 228 resides in the mobile automation apparatus 103, in other embodiments the actions performed by some or all of the components of FIG. 2C may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 107, as well as criticality level of the underlying instruction(s).

Turning now to FIG. 2C, before describing the actions taken by the apparatus 103 to generate navigational data, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a path executor 250 configured to control the locomotive mechanism 203 to travel along navigational paths. The path executor 250 is also configured to detect obstacles (e.g. from sensor data, such as data captured by the lidar sensors 211) and store data representing such obstacles, e.g. in an obstacle map in the repository 232. The path executor 250 is further configured to maintain updated localization data for the apparatus 103 (e.g. relative to the frame of reference 102).

The application 228 also includes a perimeter generator 252 configured to generate perimeter regions for obstacles represented in the maps stored in the repository 232, including the above-mentioned obstacle map. As will be discussed below, the perimeter regions may also be referred to as inflation regions, and indicate space within the environment that may be considered obstructed for the purpose of path generation by a path generator 254.

The path generator 254 is configured to generate paths for execution by the path executor 250, including both the global and local paths mentioned above. The path generator 254 may apply any of a variety of suitable path generation mechanisms. The path generation mechanisms implemented by the path generator 254, however, typically require the path generator 254 to distinguish between space in the environment that is obstructed, and therefore unsuitable for traversal by a navigational path, and space that is unobstructed, and therefore suitable for traversal by a navigational path. The path generator 254 is configured to identify unobstructed space based on the above-mentioned maps and the perimeter regions generated by the perimeter generator 252.

As will be described below in greater detail, when the path to be generated is a global path, the path generator 254 relies on a global static map, e.g. stored in the repository 232. The global static map indicates, in the common frame of reference 102, one or more predefined obstacle boundaries corresponding to static obstacles in the operating environment. The global map is typically generated during deployment of the system 100 within the environment, and the obstacles therefore include objects such as the shelves 110. Global paths, as noted earlier, typically extend between start and goal locations, and may therefore traverse substantial distances (e.g. 30 m or more) in the operating environment. Such distances extend beyond the field of view perceived by the apparatus 103 via the sensors discussed in connection with FIGS. 2A and 2B. Local paths, in contrast, typically extend over smaller distances (e.g. up to about 5 m) that fall within the field of view perceived by the apparatus 103, as represented by the above-mentioned obstacle map. That is, while significant portions of global paths must be generated based only on the global map, local paths can be generated based on both the global map and the obstacle map. Thus, as will be discussed below, a further static map is employed for use in generating local paths, which contains the same obstacle definitions as the global map but to which smaller perimeter regions are applied.

Figure 3:
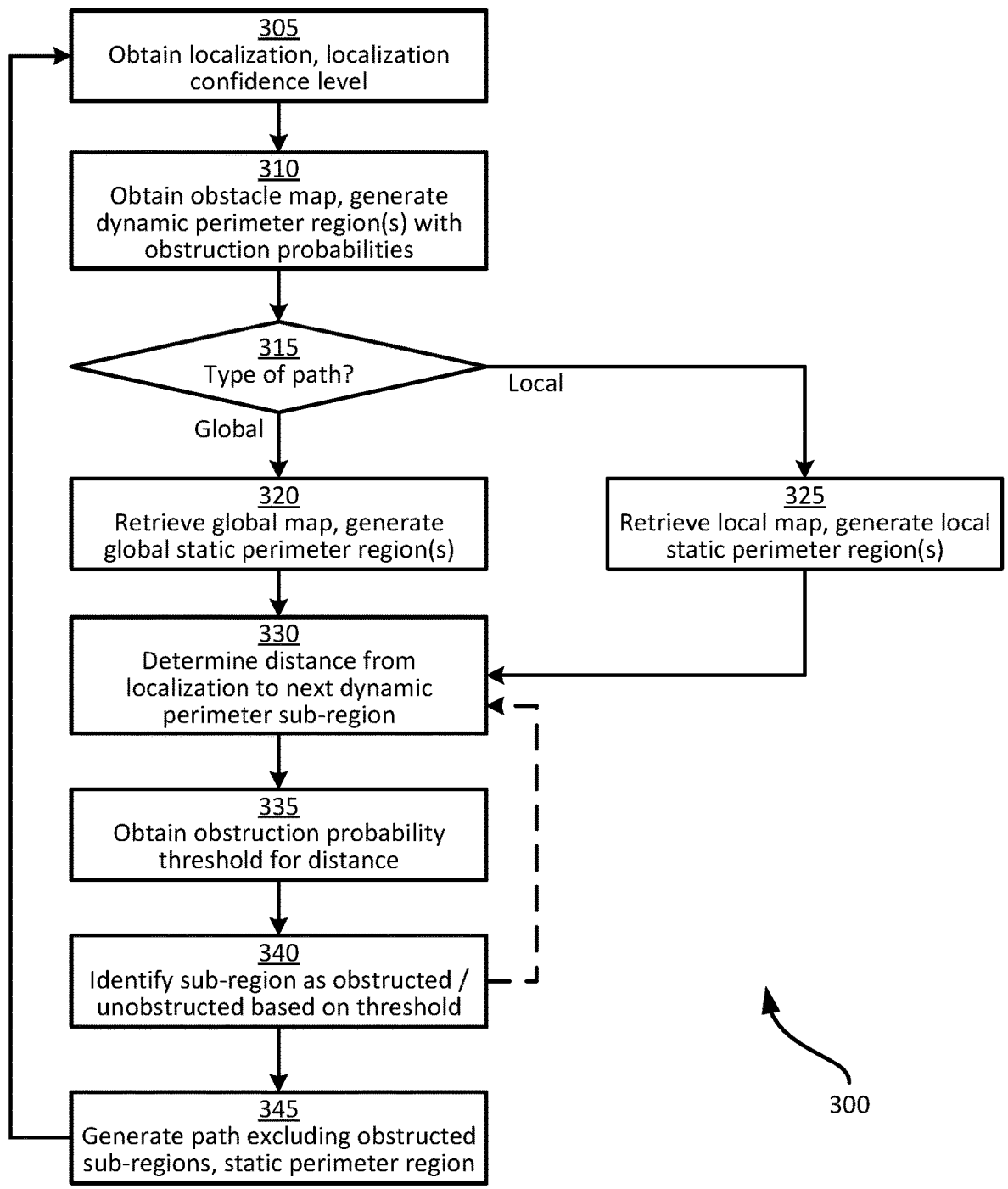
FIG. 3 is a flowchart of a method for path generation at the apparatus of FIG. 1.

The functionality of the application 228 will now be described in greater detail. In particular, the generation of perimeter regions for obstacles and the identification of unobstructed space for planning of navigational paths will be described as performed by the apparatus 103. Turning to FIG. 3, a method 300 of generating navigational paths is shown. The method 300 will be described in conjunction with its performance by the apparatus 103, with reference to the components illustrated in FIG. 2C.

At block 305, the apparatus 103 is configured to obtain a localization and a localization confidence level. The localization indicates the position and orientation, also referred to as the pose, of the apparatus 103 within the frame of reference 102. The localization confidence level, which may also be referred to as localization certainty level, indicates the probable accuracy of the localization, as assessed by the apparatus 103. Various mechanisms for generating localizations and associated confidence levels will occur to those skilled in the art, including mechanisms based on any one or more of odometry data (e.g. received at the processor 220 from wheel sensor or the like included in the locomotive mechanism 203), inertial sensor data (e.g. from an inertial measurement unit (IMU)), lidar data, or the like. The localization confidence level is typically generated simultaneously with the localization itself.

Figure 4A:
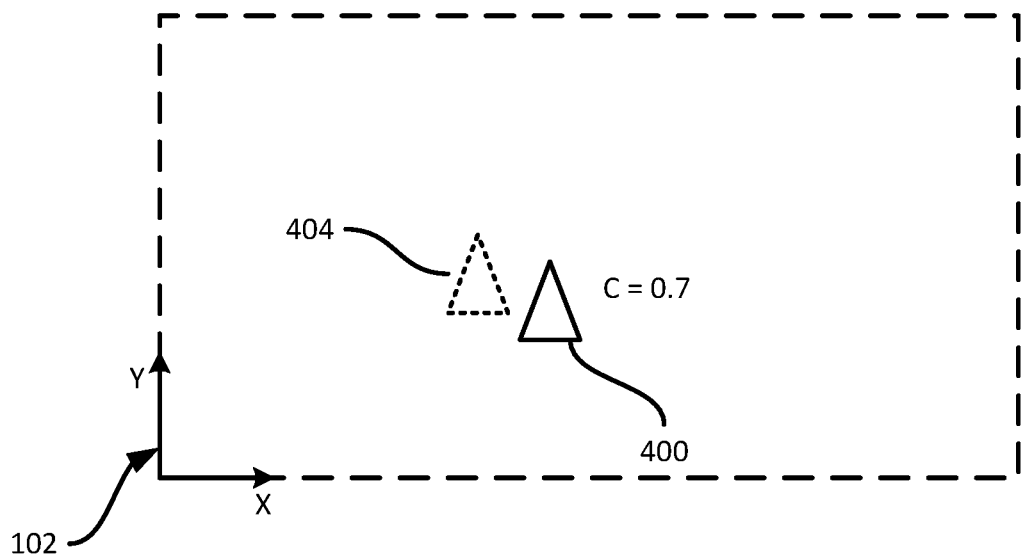
FIGS. 4A and 4B are diagrams illustrating example localizations of the mobile automation apparatus during the performance of the method of FIG. 3.
Figure 4B:
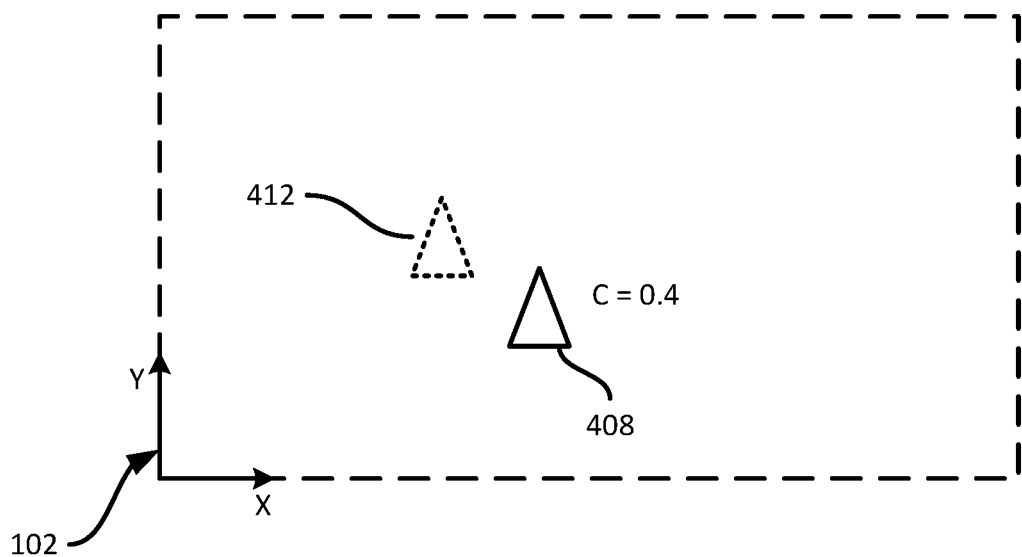

Turning to FIG. 4A, the frame of reference 102 is shown, along with a localization 400 generated by the path executor 250 at block 305 and a corresponding localization confidence level "C". In the present example, the localization confidence level is expressed as a value between zero and one (C=0.7 in the example of FIG. 4A), with values closer to one indicating higher confidence in the localization 400. The actual position 404 of the apparatus 103 (not known to the apparatus 103) is also illustrated in FIG. 4A. FIG. 4B illustrates another example of the frame of reference 102 and a localization 408 generated at block 305 with a smaller localization confidence level (C=0.4) than in FIG. 4A. An actual location 412 of the apparatus 103, as shown in FIG. 4B, is further from the localization 408, as reflected by the smaller localization confidence level. As will now be apparent to those skilled in the art, the localization confidence levels may be expressed in a variety of ways other than that shown in FIGS. 4A and 4B. For example, a range of values beyond the range from zero to one noted above may be employed. Further, the localization confidence level may be expressed as a localization uncertainty or error level, in which greater values indicate less accurate localizations.

Returning to FIG. 3, at block 310, the apparatus 103 is configured to obtain an obstacle map. The obstacle map, in the present example, is generated by the path executor 250 based on sensor data such as scan data from the lidar sensors 211. In particular, the path executor 250 is configured to receive and process the sensor data to detect one or more obstacles in the surroundings of the apparatus 103, and to assign the above-mentioned obstacles locations within the frame of reference 102 according to the localization from block 305.

FIG. 5 illustrates an obstacle map 500 generated at block 310, and indicating obstacle boundaries (detected via lidar sensor data, for example) 504-1, 504-2, 504-3 and 504-4. As will now be apparent, the obstacle boundaries 504 are shown as complete outlines of the actual obstacles (e.g. shelves 110 and the like), for clarity of illustration. In practice, the obstacle boundaries detected by the apparatus 103 at block 310 may include only the portions of the obstacles facing the apparatus 103. The positions of the obstacle boundaries 504 relative to the apparatus 103 are indicated by the sensor data (e.g. lidar scan data). The positions of the obstacle boundaries 504 in the frame of reference 102, however, are assigned based on the relative positions noted above and the localization of the apparatus 103 from block 305. In other words, the positions of the obstacle boundaries 504 in the frame of reference 102 are subject to localization errors in the localization generated by the apparatus 103.

The apparatus 103 is configured to represent potential errors in the positions of the obstacle boundaries 504 at block 310 by generating (via execution of the perimeter generator 252) dynamic perimeter regions for each obstacle boundary, indicating obstruction probabilities corresponding to the obstacle boundary. In the present example, each dynamic perimeter region (which may also be referred to as a dynamic inflation region) extends from the corresponding obstacle boundary 504 by a predefined distance (also referred to as the inflation radius). The obstruction probabilities are values assigned to sub-regions of the dynamic perimeter region based on the distance of a given sub-region from the obstacle boundary 504 itself, and on the localization confidence level from block 305.

In the present example, the obstacle map 500 is generated and stored at the apparatus as an occupancy grid, in which the frame of reference 102 is divided into a plurality of cells each containing a value (which may also be referred to as a score) that indicates whether the cell is occupied by an obstacle or whether the cell is free (unoccupied). Various suitable values may be employed. In the present example, the values are in a range from zero (indicating free space) to 255 (indicating obstructed space). In other examples, a wide variety of other suitable ranges of values may be assigned to occupancy grid cells, such as values between zero and one, as will be understood by those skilled in the art.

Thus, cells corresponding to obstacle boundaries are assigned values of 255 in the present example, while cells corresponding to space between the apparatus 103 and an obstacle boundary (i.e. space in which no obstacles were detected at block 310) are considered free space, and assigned values of zero. Some cells, such as those in the area 508 as shown in FIG. 5A, correspond to portions of the environment that are not visible to the sensors of the apparatus 103. Such cells are assigned values according to a static map (e.g. the global static map mentioned above). Two areas 512 and 516 of the obstacle map 500 are highlighted, for further discussion below in connection with FIGS. 6A-6B and 7.

The perimeter generator 252 is configured, in the present example, to assign obstruction probabilities to cells within the dynamic perimeter regions of each obstacle boundary 504. The obstruction probabilities have values between zero and the maximum value indicating certain obstruction (e.g. 255 in the present example), including intermediate values (e.g. 128) indicating a potential obstruction. Whether such intermediate values are considered obstructions at the time of path generation depends on the position of the apparatus 103 relative to the regions assigned such intermediate values, as will be discussed below. In other words, the obstruction probabilities assigned by the perimeter generator 252 have values between 0 and 255. In some embodiments, the minimum obstruction probability need not be zero, but can be an intermediate value, such as 127. FIG. 5B is an example of such an embodiment. FIGS. 5B and 5C illustrate example functions defining obstruction probabilities for the sub-regions (e.g. cells) of the dynamic perimeter regions according to the distance from the sub-regions to the corresponding obstacle boundary 504. In particular, FIG. 5B illustrates an example function for assigning obstruction probabilities to cells within 35 cm of an obstacle boundary. Distances other than 35 cm can be employed in other embodiments. For example, a distance other than 35 cm can be selected according to the radius of the apparatus 103 (or, when the chassis 201 of the apparatus 103 is not circular, the radius of a circumscribed circle encompassing the chassis 201), with or without a predefined safety margin. In particular, the function is scaled according to the localization confidence level, between a base or default function 520 and a maximally scaled function 524. The functions 520 and 524 assign obstruction probabilities between values of 128 and 254 (that is, 128 is the minimum obstruction probability assigned).

The base function 520 corresponds to a localization confidence level of zero (i.e. low localization certainty), while the maximally scaled function 524 corresponds to a localization confidence level of one (i.e. high localization certainty). Thus, when the localization confidence level is C=1, cells immediately adjacent to an obstacle boundary 504 are assigned obstruction probabilities of 254, while cells 35 cm from the obstacle boundary 504 are assigned, by the perimeter generator 252, obstruction probabilities of 178. When the localization confidence level is C=0, in contrast, cells immediately adjacent to an obstacle boundary 504 are assigned obstruction probabilities of 178, while cells 35 cm from the obstacle boundary 504 are assigned obstruction probabilities of 128. When the localization confidence level is between zero and one, the base function 520 is scaled to a position between the functions 520 and 524. The obstruction probabilities assigned according to the functions shown in FIG. 5B affect the thickness of the perimeter regions that will be considered as obstructed by the path generator 254. The path generator 254 interprets cells within the perimeter regions as obstructed or free according to a threshold value, to be discussed in greater detail below.

FIG. 5C illustrates a further function defining obstruction probabilities. In particular, in the embodiment shown in FIG. 5C, the perimeter generator 252 is configured to generate an inner dynamic perimeter region according to the function 520 and scaled versions thereof (up to the maximally scaled function 524) as discussed in connection with FIG. 5B. The perimeter generator 252 is also configured, however, to generate an outer perimeter region (e.g. between 35 cm and 50 cm from the obstacle boundary 504) in which the obstacle probability decays from 128 to zero according to a decay function 528. The outer perimeter region may therefore be referred to as a decay perimeter region. As shown in FIG. 5C, obstruction probabilities within the decay perimeter region are not dependent on localization confidence.

Although the functions shown in FIGS. 5B and 5C are illustrated as graphs, the apparatus 103 need not store the graphs as illustrated. In other embodiments, the apparatus 103 can store in the memory 222 one or more parameters defining the functions 520, 524 and 528. In further embodiments the apparatus 103 can store precomputed lookup tables of obstruction probabilities for various distances and localization confidence levels. Further, the functions 520, 524 and 528 need not have the shapes shown in FIGS. 5B and 5C. For example, in some embodiments the maximally scaled function 524 (corresponding to 100% localization certainty) need not assign reduced obstruction probabilities as the distance from the obstacle boundary 504 increases towards 35 cm. Instead, for example, the function 524 can assign obstruction probabilities of 254 for every cell within the dynamic perimeter region. Still further, the distance of 35 cm defining the dynamic perimeter region (as well as the distance of 50 cm defining the decay region) are presented for illustrative purposes only. A wide variety of other distances above and below those noted above may be employed, for example depending on the physical size of the apparatus 103, the environment in which the apparatus 103 is deployed, the accuracy of the sensors (e.g. the lidars 211) and the like.

Figure 6A:
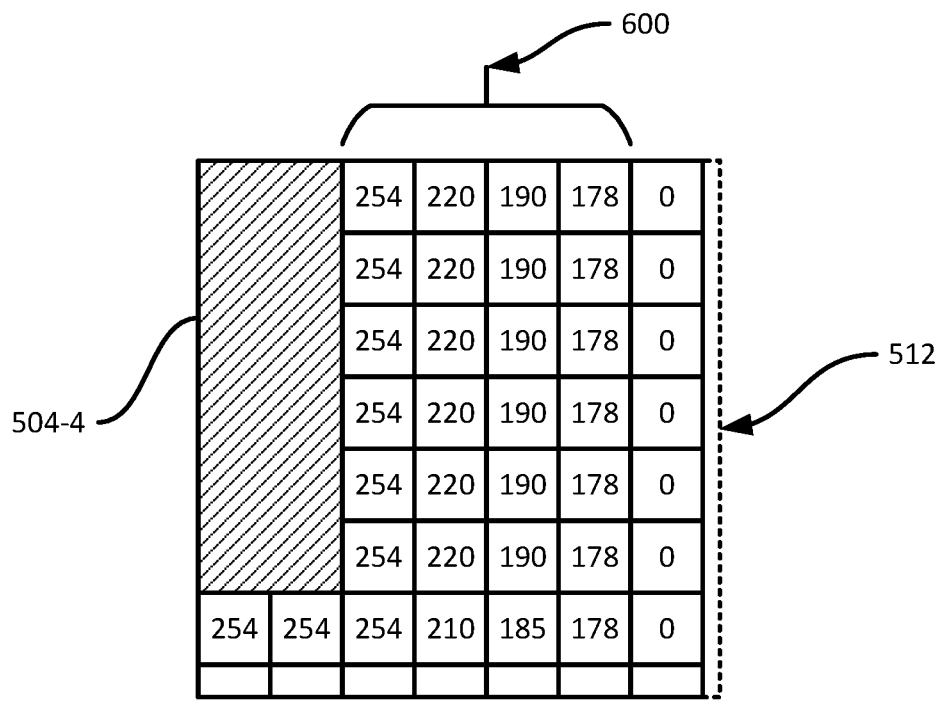
FIGS. 6A, 6B and 7 are diagrams illustrating the assignment of obstruction probability values to the obstacle map of FIG. 5A.
Figure 6B:
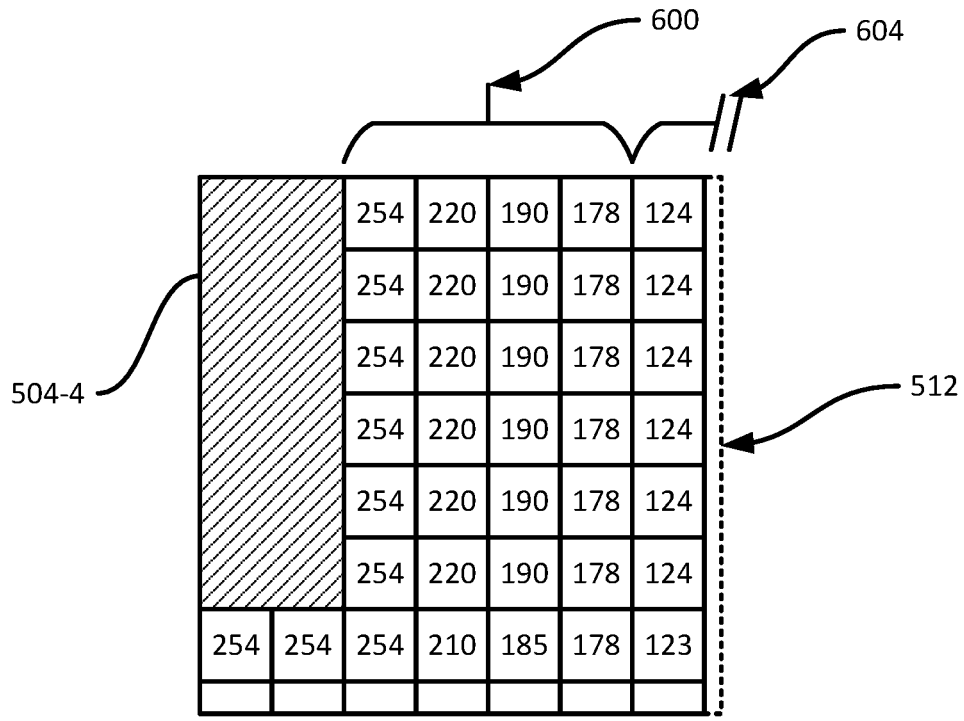

FIGS. 6A and 6B illustrate examples of the portion 512 of the obstacle map highlighted in FIG. 5A following generation of the dynamic perimeter regions at block 310. In particular, a portion of the obstacle boundary 504-4 is shown (as will be apparent from the discussion above, the cells within the obstacle boundary 504-4 have values of 255), as well as a dynamic perimeter region 600 (with an inflation radius of 35 cm, in the present example) containing a plurality of cells, each having been assigned an obstruction probability. In the region 512 as shown in FIG. 6A, the function shown in FIG. 5B has been employed, and thus cells beyond the dynamic perimeter region 600 have values of zero. In the region 512 as shown in FIG. 6B, the function shown in FIG. 5C has been employed, and thus cells beyond the dynamic perimeter region 600 that fall within a decay region 604 are assigned descending obstruction probabilities according to the function 528.

Figure 7:
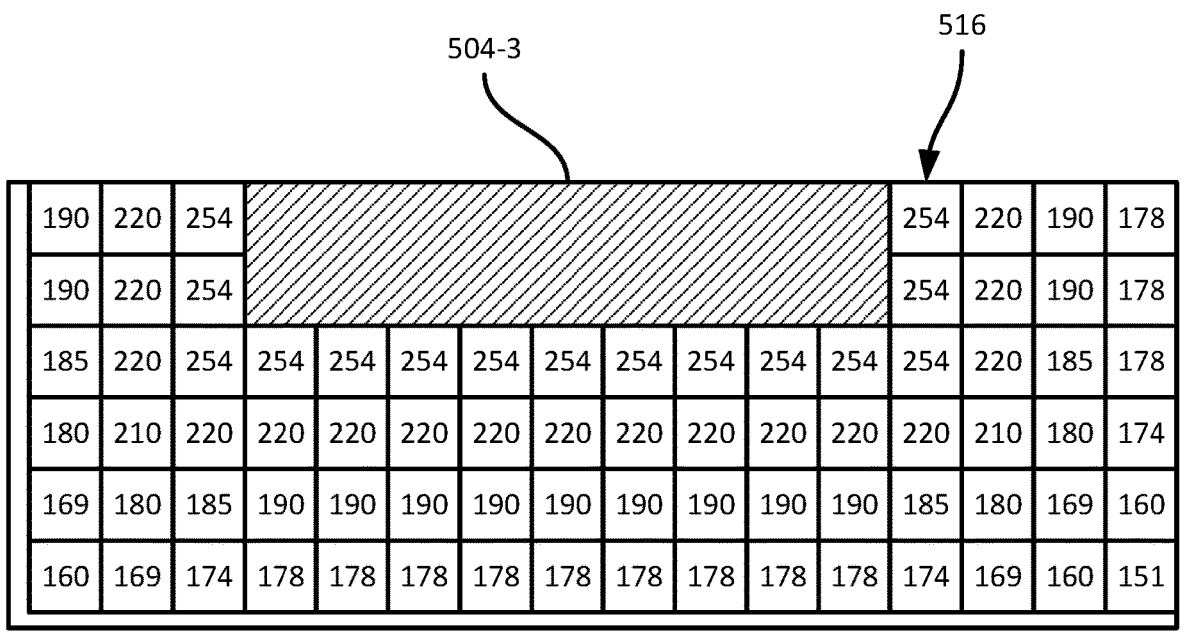

FIG. 7 illustrates the region 516 indicated in FIG. 5A, which contains a portion of the obstacle boundary 504-3 as well as dynamic perimeter region extending out from the obstacle boundary and containing obstruction probabilities assigned according to the functions of FIG. 5B.

Returning to FIG. 3, at block 315 the apparatus 103 is configured, based on the type of path to be generated, to proceed to either block 320 or block 325. In particular, for generating a global path (e.g. a sequence of poses as noted above), the path generator 254 is configured to proceed to block 320, whereas for generating a local path, the path generator 254 is configured to proceed to block 325. In other embodiments, the path generator 254 is implemented as distinct global and local planners, configured to perform blocks 320 and 325 independently.

When the path to be generated is a global path, at block 320 the apparatus 103 is configured to retrieve a global map from the repository 232. As noted above, the global map indicates, in the common frame of reference 102, one or more predefined obstacle boundaries corresponding to static obstacles in the operating environment.

Figure 8A:
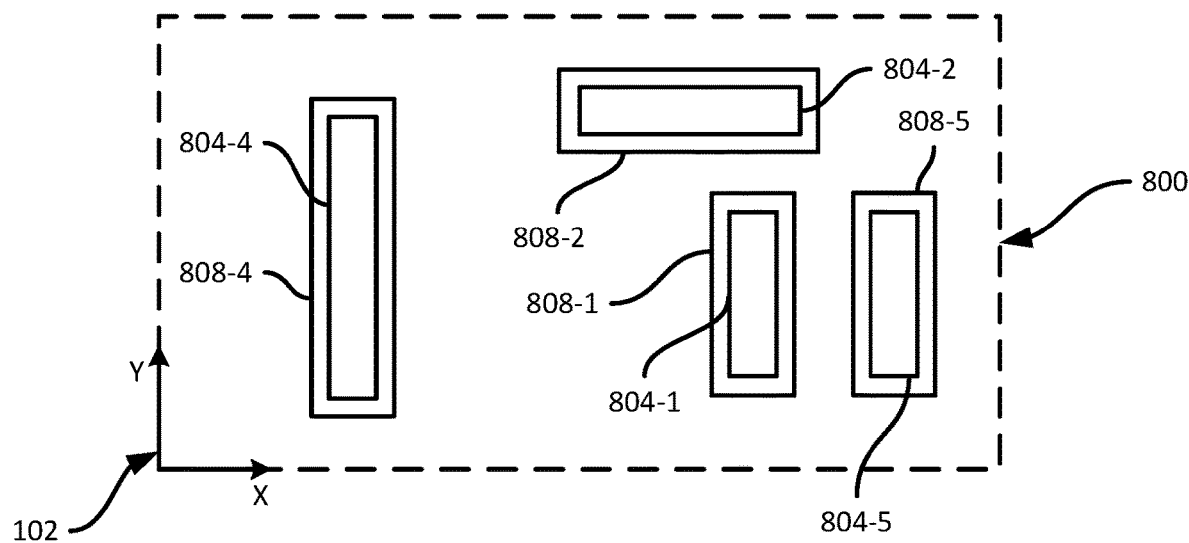
FIGS. 8A and 8B are diagrams illustrating global and local static maps, respectively.

Generation of the static perimeter regions for predefined obstacles of the global map at block 320, in contrast to the dynamic perimeter region discussed above, includes assigning values to cells in the static perimeter regions that indicate that the space is occupied (e.g. values of 255 in the present example), rather than assigning obstruction probabilities. That is, the static perimeter regions simply indicate that the cells therein are occupied, irrespective of distance from the corresponding obstacle and of location or localization confidence of the apparatus 103. Turning to FIG. 8A, a global static map 800 is illustrated including obstacle definitions 804-1, 804-2, 804-4 and 804-5. Each obstacle definition 804 includes a respective static perimeter region 808-1, 808-2, 808-4 and 808-5. For example, the static perimeter regions 808 may have inflation radii of 35 cm, though as noted above other inflation radii may also be employed.

Returning to FIG. 3, when the path to be generated is a local path, at block 325 the apparatus 103 is configured to retrieve a local map (also referred to as a local static map) from the repository 232. In some embodiments, rather than storing the local map in the repository 232 separately from the global map, the local map can be generated from the global map at block 325, as the local map includes the same predefined obstacles as the global map. That is, the local map indicates, in the common frame of reference 102, one or more predefined obstacle boundaries corresponding to static obstacles in the operating environment. At block 325, in contrast to the performance of block 320, however, the apparatus 103 is configured to generate local static perimeter regions having a smaller inflation radius than the global static perimeter regions 808 generated at block 320. As discussed earlier, because local path planning can also rely on the obstacle map (rather than relying solely on the static map), the local static map can be relied upon with a reduced safety margin (in the form of smaller inflation radii).

Figure 8B:
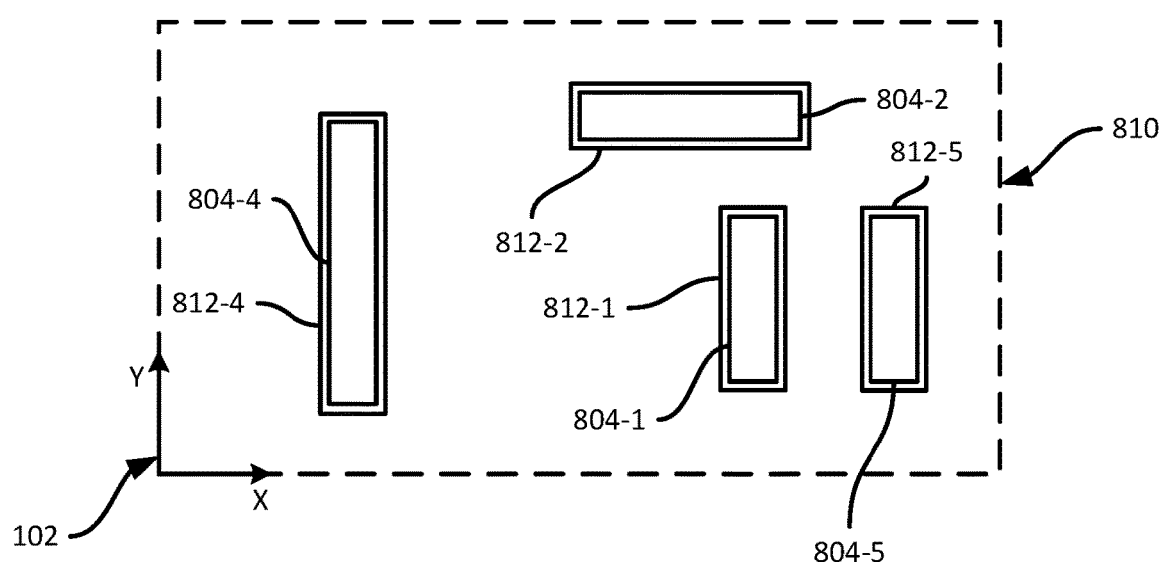

FIG. 8B illustrates a local map 810 retrieved at block 325, for which local static perimeter regions 812-1, 812-2, 812-4 and 812-5 have been generated. As is evident in FIG. 8B, the local static perimeter regions 812 extend a smaller distance from the corresponding obstacles 804 in comparison to the global static perimeter regions 808 discussed in connection with FIG. 8A. For example, whereas the global static perimeter regions 808 extend about 35 cm from the obstacles 804, the local static perimeter regions 812 extend 10 cm from the obstacles 804. As will be described below in further detail, the reduced depth of the local static perimeter regions 812 may permit the apparatus 103 to make use of a greater portion of the map 810 when planning a local path, which may reduce the computational load imposed by local path planning, and which may also mitigate the possibility of path generation failure caused by extensive perimeter regions.

Referring again to FIG. 3, having retrieved the appropriate static map at block 320 or block 325, at blocks 330-345 the apparatus 103 is configured to identify free (i.e. unobstructed) space within the frame of reference 102 in which to generate a path. Unobstructed space is identified from the map retrieved at block 320 and 325, excluding the static perimeter regions 808 or 812 and corresponding predefined obstacle boundaries 804. Unobstructed space also excludes certain portions of the obstacle map obtained at block 310. At blocks 330-340 in particular, therefore, the apparatus 103 is configured to identify obstructed portions of the dynamic perimeter regions (e.g. the regions discussed above in connection with FIGS. 6A, 6B and 7) based on the obstruction probabilities within the dynamic perimeter regions, and on the localization of the mobile automation apparatus. The performance of blocks 330-340 is repeated, as indicated by the dashed line returning from block 340 to block 330, for each of a plurality of sub-regions in each dynamic perimeter region of the obstacle map 500. For example, blocks 330-340 may be repeated for every sub-region (i.e. cell, in the present example) of each dynamic perimeter region. In other examples, only a subset of the cells of each dynamic perimeter region may be assessed at blocks 330-340, according to a sampling-based path planning algorithm.

Figure 9A:
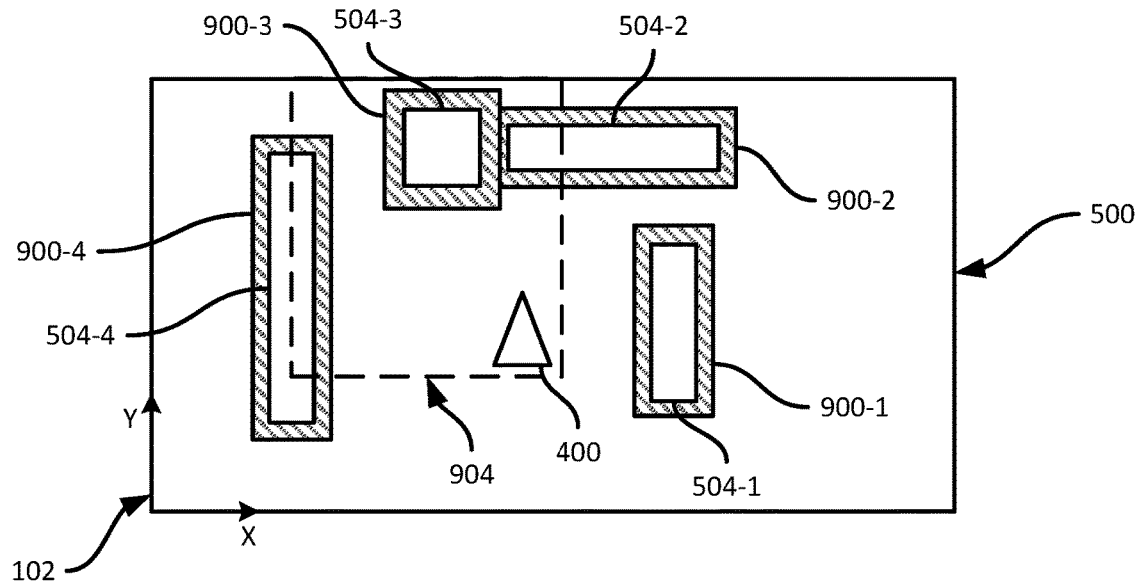
FIGS. 9A and 9B are diagrams illustrating the identification of obstructed portions of dynamic perimeter regions in the obstacle map of FIG. 5A.

At block 330, for a selected sub-region of a selected dynamic perimeter region, the apparatus 103 is configured to determine the distance (in a straight line) from the selected sub-region to the apparatus 103, within the frame of reference 102. Turning to FIG. 9A, the obstacle map 500 is shown, with dynamic perimeter regions 900-1, 900-2, 900-3 and 900-4 corresponding to the obstacle boundaries 504. A portion 904 of the obstacle map 500 is shown in detail in FIG. 9B, in which a distance 908 between the localization of the apparatus 103 and a selected cell of the dynamic perimeter region 900-3 is illustrated. Returning to FIG. 3, at block 335 the apparatus 103 is configured to obtain an obstruction probability threshold corresponding to the distance determined at block 330. The threshold referred to at block 335 is a threshold beyond which (i.e. for obstruction probabilities exceeding the threshold) a cell is considered obstructed by the path generator 254 for the current path planning operation, and below which a cell is considered unobstructed.

Figure 9B:
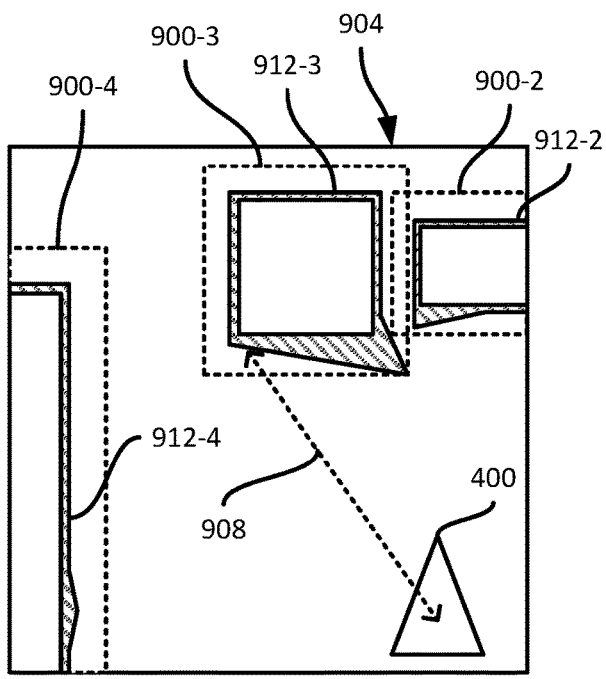
Figure 9C:
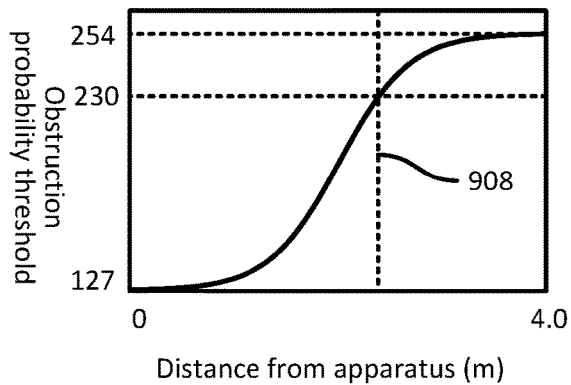
FIG. 9C is a diagram illustrating example thresholds for use in the identification of obstructed portions of dynamic perimeter regions.

FIG. 9C illustrates an example set of thresholds, illustrated in a graph (although it will be understood that the thresholds need not be stored in graph form at the apparatus 103, but can instead be stored parametrically, as a look up table, or the like). The distance 908 is shown in FIG. 9C, as is the corresponding obstruction probability threshold of 230. At block 340, the apparatus 103 is configured to identify the selected sub-region as obstructed or unobstructed according to the retrieved threshold and the obstruction probability in the sub-region. In the present example, the sub-region has an obstruction probability of 220. Because the obstruction probability does not exceed the threshold, the sub-region is identified as unobstructed space, despite being within the dynamic perimeter region 900-3.

The above process (i.e. blocks 330-340) is repeated for a plurality of sub-regions in each of the dynamic perimeter regions 900, to identify obstructed portions 912 (examples 912-2, 912-3 and 912-4 are shown in FIG. 9B). The remainder of the dynamic perimeter regions 900 are identified as unobstructed space. The obstructed portions 912 of the dynamic perimeter regions 900 can be stored separately from the obstacle map 500 itself, for example in a discrete free space map. In other examples, the obstructed portions 912 are stored within the obstacle map 500 itself (e.g. by overwriting the obstruction probabilities with zero values for unobstructed space and values of 255 for obstructed space). As noted above, in some embodiments the sub-regions to be assessed via the performance of blocks 330-340 need not encompass an entire dynamic perimeter region. Instead the apparatus 103 can be configured to generate points defining a candidate path, and perform blocks 330-340 only for those points.

Figure 10A:
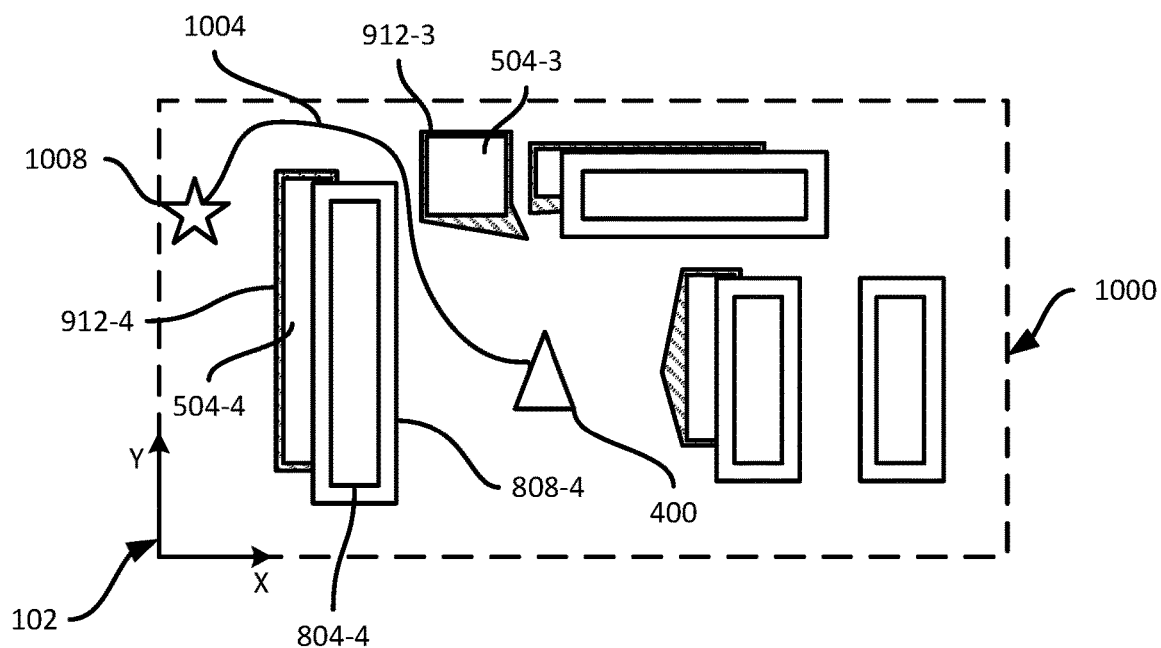
FIGS. 10A and 10B are diagrams illustrating path generation according to the global and local static maps, respectively, as well as the obstructed portions of the dynamic perimeter regions.

Returning to FIG. 3, at block 345 the apparatus 103 is configured to generate a path traversing unobstructed space in the common frame of reference 102. As noted above, the unobstructed space excludes the obstructed portions 912 of the dynamic perimeter regions 900, and also excludes the static perimeter regions generated at blocks 320 and/or 325. The apparatus 103 can be configured to overlay the obstacle map 500 with the static map retrieved at block 320 or 325 to identify the total unobstructed space available for path generation. FIG. 10A, for example, illustrates an overlay 1000 including the global static map 800 overlaid with the obstacle map 500 following identification of the obstructed portions 912. The apparatus 103 is configured to generate a path 1004 between the localization 400 and a goal location 1008 (e.g. received from the server 101).

As will be apparent from FIG. 10A, certain obstacles represented in the obstacle map 500 correspond to certain predefined obstacles from the static map. However, the positions of such obstacles (e.g. the obstacles 504-4 and 804-4) do not align in the frame of reference 102 as a result of error in the localization 400 of the apparatus 103. Thus, the obstacle 804-4 represents an imaginary, or virtual, obstacle. The true position of the corresponding shelf relative to the apparatus 103 is reflected by the obstacle boundary 504-4. As is evident in FIG. 10A, misalignment between the obstacle map data and the static global map data reduces the available unobstructed space between the obstacles 504-3 and 804-4. However, the identification of the obstructed portion 912-3 of the dynamic perimeter region 900-3 yields additional unobstructed space between the obstacles 504-3 and 804-4, which may ease path planning between the obstacles 504-3 and 804-4.

Figure 10B:
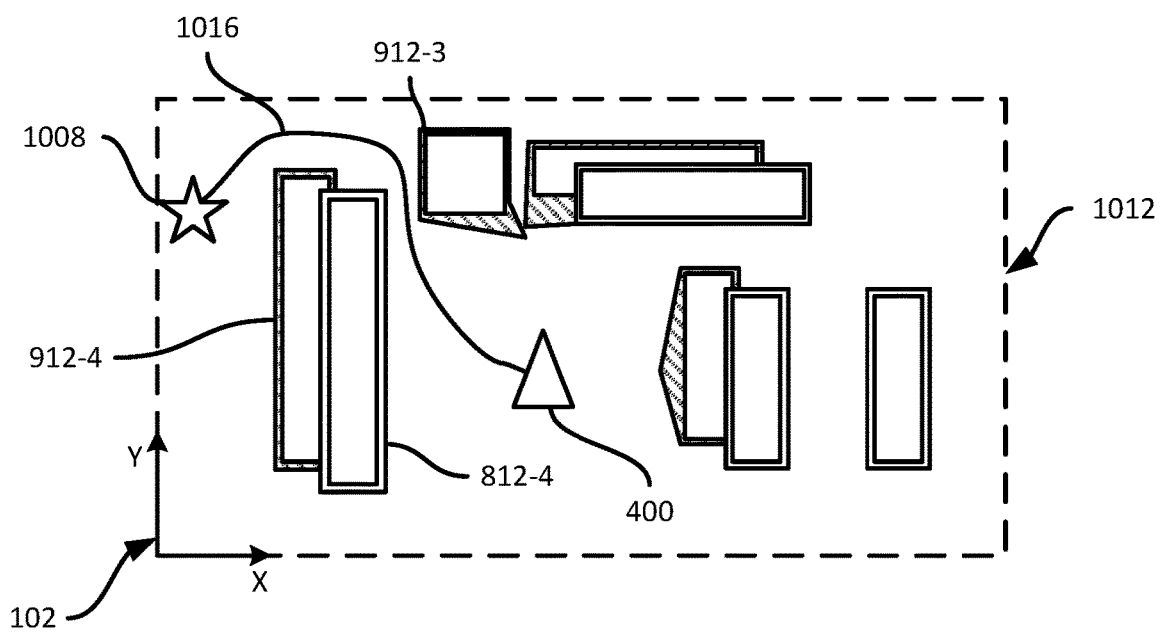

FIG. 10B illustrates an overlay 1012 of the local static map 810 and the obstacle map 500. As shown in FIG. 10B, generation of a path 1016 from the localization 400 to the goal location 1008 makes available additional unobstructed space between the obstacles 504-3 and 804-4, beyond that shown in FIG. 10A, as a result of the reduced size of the local static perimeter region 812-4.

Following generation of a path at block 345, the apparatus 103 is configured, for example during execution of the path, to return to block 305 and generate updated localization and obstacle data.

Variations to the above systems and methods are contemplated. In some embodiments, for example, the distinction between global and local maps at blocks 315-325 is omitted, and only the global map is employed. In further embodiments, the generation of dynamic perimeter regions within the obstacle map is omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of navigational path planning for a mobile automation apparatus, the method comprising:
   obtaining (i) a localization of the mobile automation apparatus in a common frame of reference and (ii) a localization confidence level of the mobile automation apparatus;
   detecting an obstacle boundary by one or more sensors disposed on the mobile automation apparatus;
   obtaining an obstacle map indicating the detected obstacle boundary in the common frame of reference;
   generating a dynamic perimeter region of the detected obstacle boundary, the dynamic perimeter region defining, for a set of distances from the detected obstacle boundary, respective obstruction probabilities according to the localization confidence level;
   obtaining a predefined environmental map indicating, in the common frame of reference, a predefined obstacle boundary;
   generating, for the predefined obstacle boundary, a static perimeter region defining obstructed space;
   identifying an obstructed portion of the dynamic perimeter region based on the obstruction probabilities and the localization of the mobile automation apparatus;
   generating a decay perimeter region surrounding the dynamic perimeter region by assigning obstruction probabilities below a predetermined value to each of a plurality of decay sub-regions;
   generating a navigational path traversing unobstructed space within the common frame of reference, the unobstructed space excluding (i) the obstructed portion of the dynamic perimeter region, and (ii) the static perimeter region; and
   controlling the mobile automation apparatus to traverse the generated navigational path.

2. The method of claim 1, wherein the dynamic perimeter region includes a plurality of sub-regions, and wherein generating the dynamic perimeter region further comprises assigning an obstruction probability to each sub-region.

3. The method of claim 2, wherein the sub-regions extend a predefined distance from the obstacle boundary.

4. The method of claim 2, wherein assigning an obstruction probability comprises, for a corresponding sub-region, determining the obstruction probability according to (i) a distance between the sub-region and the detected obstacle boundary and (ii) the localization confidence level.

5. The method of claim 2, wherein the obstruction probabilities in the dynamic perimeter region are selected from a range extending from an upper value corresponding to certainty of obstruction to an intermediate value.

6. The method of claim 5, wherein the intermediate value is the predetermined value.

7. The method of claim 2, wherein identifying the obstructed portion of the dynamic perimeter region comprises:
   selecting a sub-region of the dynamic perimeter region;
   determining a distance, in the common frame of reference, from the localization to the selected sub-region;
   based on the distance, retrieving an obstruction probability threshold from a memory; and
   determining whether the obstruction probability corresponding to the sub-region exceeds the obstruction probability threshold.

8. The method of claim 1, wherein obtaining the predefined environmental map includes retrieving, from a memory, one of a global static map and a local static map; and
   wherein the static perimeter region extends a first distance from the predefined obstacle boundary for the global static map, and a second distance from the predefined obstacle boundary for the local static map.

9. The method of claim 8, wherein the first distance is greater than the second distance.

10. A mobile automation apparatus for navigational path planning, comprising:
    one or more navigational sensors disposed on the mobile automation apparatus;
    a memory storing a predefined environmental map indicating, in a common frame of reference, a predefined obstacle boundary;
    a navigational controller connected to the memory, the navigational controller including:

a path executor configured to:
  obtain, via the one or more navigational sensors, (i) a localization of a mobile automation apparatus in a common frame of reference and (ii) a localization confidence level;
  obtain, via the one or more navigational sensors, an obstacle map indicating, in the common frame of reference, an obstacle boundary detected via mobile automation apparatus sensor data;
a perimeter generator configured to: generate a dynamic perimeter region of the obstacle boundary, the dynamic perimeter region defining, for a set of distances from the obstacle boundary, respective obstruction probabilities according to the localization confidence level;
the perimeter generator further configured to generate, for the predefined obstacle boundary, a static perimeter region defining obstructed space;
a path generator further configured to:
  retrieve the predefined environmental map;
  identify an obstructed portion of the dynamic perimeter region based on the obstruction probabilities and the localization of the mobile automation apparatus;
  generate a decay perimeter region surrounding the dynamic perimeter region by assigning obstruction probabilities below a predetermined value to each of a plurality of decay sub-regions; and
  generate a navigational path traversing unobstructed space within the common frame of reference, the unobstructed space excluding (i) the obstructed portion of the dynamic perimeter region, and (ii) the static perimeter region;
the path executor further configured to control a locomotive mechanism of the mobile automation apparatus to traverse the generated navigational path.

11. The mobile automation apparatus of claim 10, wherein the dynamic perimeter region includes a plurality of sub-regions, and wherein the navigational controller is configured, to generate the dynamic perimeter region, to assign an obstruction probability to each sub-region.

12. The mobile automation apparatus of claim 11, wherein the sub-regions extend a predefined distance from the obstacle boundary.

13. The mobile automation apparatus of claim 11, wherein the navigational controller is configured, to assign an obstruction probability, to:
  for a corresponding sub-region, determine the obstruction probability according to (i) a distance between the sub-region and the obstacle boundary and (ii) the localization confidence level.

14. The mobile automation apparatus of claim 11, wherein the obstruction probabilities in the dynamic perimeter region are selected from a range extending from an upper value corresponding to certainty of obstruction to an intermediate value.

15. The mobile automation apparatus of claim 14, wherein the intermediate value is the predetermined value.

16. The mobile automation apparatus of claim 11, wherein the navigational controller is configured, to identify the obstructed portion of the dynamic perimeter region, to:
  select a sub-region of the dynamic perimeter region;
  determine a distance, in the common frame of reference, from the localization to the selected sub-region;
  based on the distance, retrieve an obstruction probability threshold from the memory; and
  determine whether the obstruction probability corresponding to the sub-region exceeds the obstruction probability threshold.

17. The mobile automation apparatus of claim 10, wherein the navigational controller is configured to retrieve, as the predefined environmental map, one of a global static map and a local static map; and
  wherein the static perimeter region extends a first distance from the predefined obstacle boundary for the global static map, and a second distance from the predefined obstacle boundary for the local static map.

18. The mobile automation apparatus of claim 17, wherein the first distance is greater than the second distance.

* * * * *